United States Patent [19]

Yamada et al.

[11] Patent Number: 4,606,641

[45] Date of Patent: Aug. 19, 1986

[54] APPARATUS FOR MEASURING FILM THICKNESS

[75] Inventors: Takeo Yamada, Yokohama; Kousaku Takasaka, Kawasaki, both of Japan

[73] Assignee: Nippon Kokan Kabushiki Kaisha, Tokyo, Japan

[21] Appl. No.: 645,924

[22] Filed: Aug. 30, 1984

[30] Foreign Application Priority Data

Aug. 31, 1983 [JP] Japan .................................. 58-159981

[51] Int. Cl.$^4$ ...................... G01B 11/06; G01N 21/21
[52] U.S. Cl. ..................................... 356/369; 356/382
[58] Field of Search ............................... 356/369, 382

[56] References Cited

U.S. PATENT DOCUMENTS 4,015,127  3/1977  Sharkins .
4,129,781  12/1978  Doyle .
4,332,476  6/1982  Stenberg et al. .................... 356/369

OTHER PUBLICATIONS

Bey "Optical Film Thickness Monitoring", *Rev. Sci. Instru.* vol. 42, No. 1, pp. 57–60, Jan. 1971.
Hunderi, "Rotating Depolarizer Ellipsometry", *Applied Optics,* vol. 16, No. 11, pp. 3012–3015, Nov. 1977.
Harris et al., "Signal Level Regulation and Dark Current Compensation for Wavelength-Scanning Ellipsometer", *IBM Tech. Discl. Bull.* vol. 21, No. 7, pp. 855–856, Jul. 1978.

*Primary Examiner*—Davis L. Willis
*Assistant Examiner*—Matthew W. Koren
*Attorney, Agent, or Firm*—Frishauf, Holtz, Goodman & Woodward

[57] ABSTRACT

An elliptically polarized monochromatic light is obtained from monochromatic light select unit and is reflected at an interface between an objective film and substrate. An extinction wavelength of the reflected light, when the amount thereof detected at photodetector becomes zero, is detected at control unit and the true thickness of the film is calculated from the detected extinction wavelength.

4 Claims, 8 Drawing Figures

F I G. 6
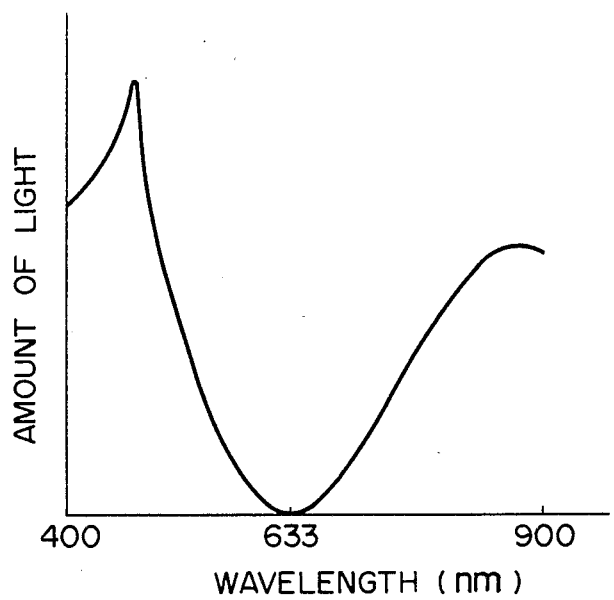
F I G. 8
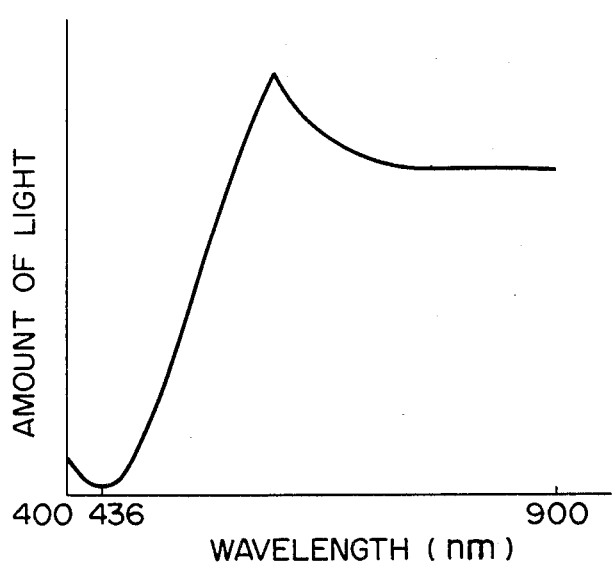

APPARATUS FOR MEASURING FILM THICKNESS

BACKGROUND OF THE INVENTION

The present invention relates to an apparatus for measuring a thickness of a film formed on an object in accordance with polarization analysis.

A chromium oxide film is formed on a plated surface of a tin free steel (TFS) plate or a nickel-plated steel plate. A thickness of a chromium oxide film greatly influences adhesion of an anti-corrosive paint to be coated on the steel plate. Control of the thickness of the chromium oxide film is one of the most important control factors in the manufacture of steel plates.

A thickness of an oil film applied by an electrostatic oil coater to a surface of a steel plate on an electric tin plating line (ETL), a TFS plate or a tin plate for export use is also one of the most important control factors for guaranteeing the quality of products.

A thickness of a chromium oxide film or an oil film is from a multiple of ten to several hundred angstroms. A highly precise measuring machine is required to measure such a fine thickness on the manufacturing line.

For this purpose, a film thickness measurement method by polarization analysis is proposed as one of the methods of measuring very fine thicknesses. According to this method, light from a light source is filtered through a monochromatic filter to obtain a monochromatic light component. The monochromatic component is incident on a first polarizer to obtain a linearly polarized light component. This linearly polarized light component is then elliptically polarized by a phase compensator. An elliptically polarized light component is then incident on an object at a predetermined angle of incidence. The polarizer and the phase compensator are arranged to linearly polarize light reflected by the object. The reflected light then passes through a second polarizer and is detected by a photodetector. When the actual thickness of the object coincides with a preset value, a phase shift acting on the incident light in accordance with an optical constant of the film cancels the phase shift caused by the phase compensator. Therefore, when the polarization directions of the first and second polarizers are directed such that the amount of light detected by the photodetector becomes zero, an unknown film thickness can be measured.

According to this method, however, the phase shift caused by the phase compensator must be adjusted every time a film thickness changes so as to set the amount of light detected by the photodetector to be zero (extinguished). When an object is conveyed at high speed, accurate on-line film thickness measurement cannot be performed in practice.

SUMMARY OF THE INVENTION

It is an object of the present invention to provide an apparatus for easily performing accurate on-line measurement of a thickness of a film formed on an object to be measured.

In order to achieve the above object of the present invention, there is provided an apparatus for measuring film thickness, comprising: a light source for emitting light having continuous spectral components; polarization controlling means for polarizing the light along a predetermined direction and radiating polarized light onto the object; a photodetector for detecting an amount of light reflected by the object and generating a light amount signal; means for detecting data representing a wavelength of a spectral component in accordance with the light amount signal such that the amount of light reflected by the object and incident on the photodetector becomes zero (extinguished); and a film thickness calculating means for calculating the thickness of the film formed on the object in accordance with resultant data.

BRIEF DESCRIPTION OF THE DRAWINGS

FIG. 6 is a graph showing the amount of light as a function of the wavelength in the photodetector shown in FIG. 5;

FIG. 8 is a graph showing the amount of light detected by the photodetector shown in FIG. 5 when a thickness of the film formed on the object changes.

DETAILED DESCRIPTION OF THE PREFERRED EMBODIMENTS

Figure 1:
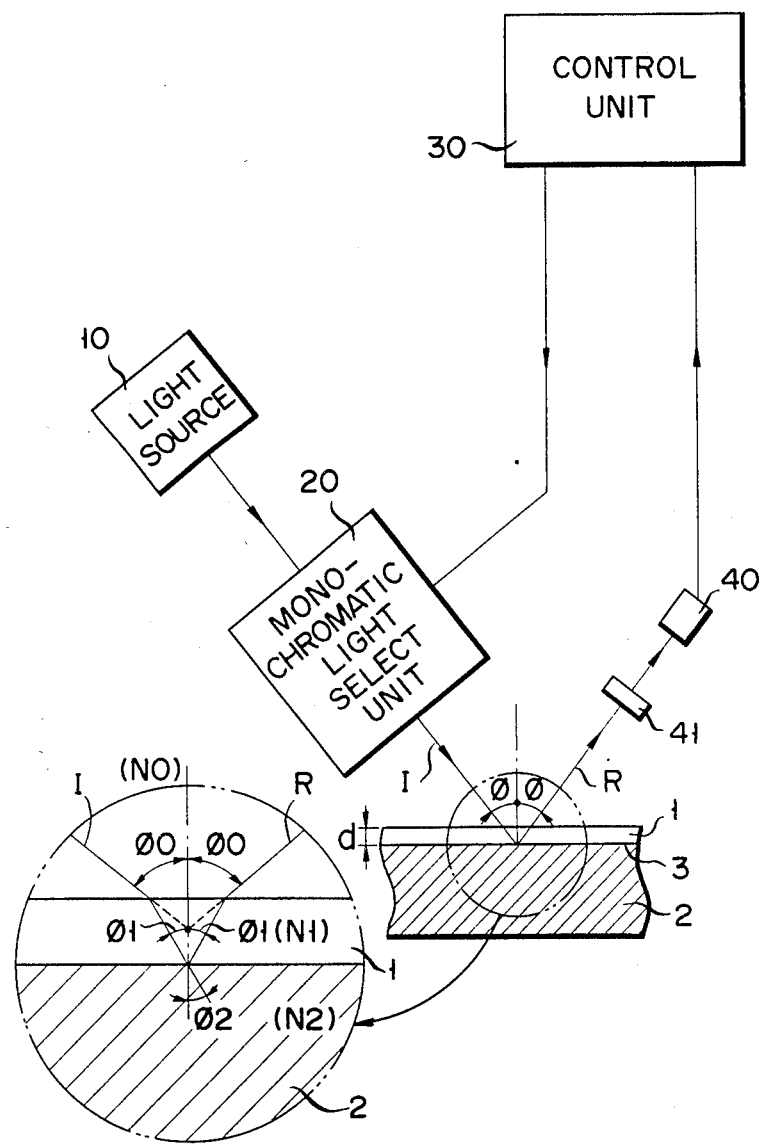
FIG. 1 is a block diagram of an apparatus for measuring a thickness of a film formed on an object to be measured according to an embodiment of the present invention.

The present invention will be described in detail with reference to the accompanying drawings. FIG. 1 shows an apparatus for measuring a thickness of a film formed on an object according to an embodiment of the present invention. Referring to FIG. 1, a chromium oxide film 1 is formed on a tin free steel plate 2 to a predetermined thickness d. Monochromatic light I from a light source 10 is incident on the film 1 at an angle $\phi$ through a monochromatic light select unit 20. The light source 10 emits light having continuous spectral components. For example, the light source 10 can comprise a white light source.

Assume that a wavelength of incident monochromatic light I, a refractive index of a medium (air in this embodiment) in which the steel plate 2 is placed, a refractive index of the chromium oxide film 1, and a refractive index of the steel plate 2 are given to be $\lambda$, $N0$, $N1$ and $N2$, respectively. Also assume that a vibration component P (of light R reflected by an interface 3 between the steel plate 2 and the chromium oxide film 1) parallel to an incident plane or a vibration component S perpendicular thereto is given to be $R\nu(\nu=P$ or $\nu=S)$. The parallel or perpendicular vibration component $R\nu$ is given as follows:

$$R^\nu = \{r1^\nu + r2^\nu \exp(-D)\} / \{1 + r1^\nu r2^\nu \exp(-D)\} \quad (1)$$

for $$r1^P = (N0 \cos \phi 1 - N1 \cos \phi 0)/N0 \cos \phi 1 + N1 \cos \phi 0) \quad (2)$$

$$r1^S = (N0 \cos \phi 0 - N1 \cos \phi 1)/(N0 \cos \phi 0 + N1 \cos \phi 1) \quad (3)$$

$$r2^P = (N1 \cos \phi 2 - N2 \cos \phi 1)/(N1 \cos \phi 2 + N2 \cos \phi 1) \quad (4)$$

$$r2^S = (N1 \cos \phi 1 - N2 \cos \phi 2)/N1 \cos \phi 1 + N2 \cos \phi 2) \quad (5)$$

$$D = 4\pi N1 d \cos \phi 1/\lambda \quad (6)$$

From the law of light refraction, we have the following equation:

$$N0 \sin \phi 0 = N1 \sin \phi 1 = N2 \sin \phi 2 \quad (7)$$

A ratio $\rho$ of the P component $R^P$ to the S component $R^S$ of the reflected light R at the interface 3 is given in accordance with equations (1) to (7) as follows:

$$\rho = R^P/R^S = (|R^P|/|R^S|)e^{(\Delta P - \Delta S)} = \tan\psi \exp(\Delta) \quad (8)$$

The reflected light R is guided to a photodetector 40 through an analyzer 41, so that a light amount signal corresponding to the amount of incident light is generated from the photodetector 40. This light amount signal is supplied to a control unit 30. The control unit 30 includes a wavelength detecting means responsive to the light amount signal to detect a wavelength at which the amount of reflected light R becomes zero, and a film thickness calculating means for calculating a thickness of a film in accordance with the detected wavelength. The control unit 30 supplies a wavelength select signal to the monochromatic light select unit 20. The monochromatic select unit 20 sets a monochromatic wavelength in accordance with this wavelength select signal.

Figure 2:
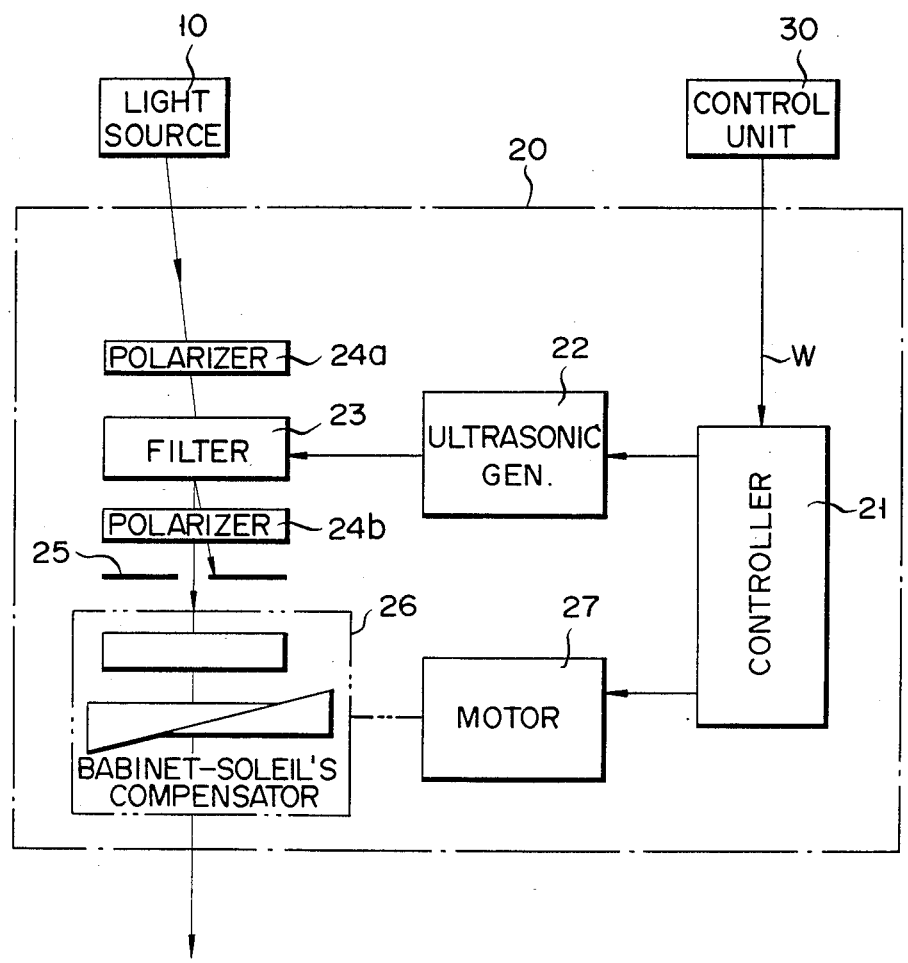
FIG. 2 is a block diagram showing the detailed arrangement of a monochromatic light select unit shown in FIG. 1.

The monochromatic light select unit 20 will be described in detail with reference to FIG. 2. Referring to FIG. 2, a wavelength select signal W supplied from the control unit 30 is supplied to a controller 21. The controller 21 comprises, for example, a ROM table for generating a frequency designation signal in response to the input wavelength select signal W. This frequency designation signal is supplied to an oscillation frequency determination terminal of an ultrasonic generator 22, so that ultrasonic oscillation is performed at a designated frequency.

The ultrasonic beam is thus generated and supplied to an acoustooptic filter 23. This filter 23 receives light emitted from the light source 10 having continuous spectral components. The Bragg diffraction phenomenon occurs in the acoustooptic filter 23. This phenomenon occurs only for the monochromatic light component having a wavelength corresponding to the designated frequency. Polarizers 24a and 24b, and a slit 25 are arranged in front of and behind the filter 23, respectively, thereby eliminating high-order diffraction light and nondiffraction light. Therefore, only a linearly polarized monochromatic light component is supplied to a Babinet-Soleil's compensator 26. A phase difference between the P and S components of the linearly polarized light is generated by the compensator 26, and elliptically polarized light I is thus obtained. The elliptically polarized light I is then incident on the substantially transparent film 1 having a thickness of several tens to several hundreds of angstroms. The compensator 26 is driven by a motor 27 in response to a drive signal supplied from the controller 21. The compensator 26 controls a predetermined phase difference (i.e., $\pi - \Delta 0$) between the P and S components regardless of changes in wavelength of the monochromatic light.

Referring again to FIG. 1, assume that the thickness of the film 1 is given as a reference thickness d0, and that the optical system, the unit 20 and the analyzer 41 are arranged such that the amount of light detected by the photodetector 40 becomes zero (extinguished) when the wavelength of the incident monochromatic light I is $\lambda 0$.

Also assume that the refractive indices N0, N1 and N2 in equations (1) to (7) will not change even if the wavelength of the incident monochromatic light changes. When the wavelength $\lambda$ and the film thickness d change to satisfy the following relation:

$$d/\lambda = d0/\lambda 0 \quad (9)$$

the value of the left-hand side $d/\lambda$ is given to be constant. Under the condition that a combination of the wavelength $\lambda$ and the film thickness d satisfies equation (6), the extinction state is constantly obtained. In other words, when the film thickness changes from d0, the wavelength of the incident monochromatic light I is swept without changing the setting of the optical system so as to obtain the wavelength $\lambda$ corresponding to the extinction state, the true film thickness can be obtained according to the following calculation:

$$d = \lambda \cdot (d0/\lambda 0) \quad (10)$$

The operation of the apparatus shown in FIGS. 1 and 2 will now be described. In this case, assume that the monochromatic light I having the reference wavelength is incident from the unit 20 on the film 1 having the reference thickness. The polarization directions of the polarizers 24a and 24b, the Babinet-Soleil's compensator 26 and the analyzer 41 are adjusted such that when the light elliptically polarized through the polarizers 24a and 24b passes through the film 1 through the Babinet-Soleil's compensator 26 in the unit 20 and is reflected by the interface 3 and the reflected light R is incident on the analyzer 41 and is incident on the photodetector 40, the amount of light incident on the photodetector 40 becomes zero. In this state, the value d0/$\lambda$0 is calculated, and a calculated value is stored in, for example, a RAM in the control unit 30.

Subsequently, the wavelength select signal W is supplied from the control unit 30 to the controller 21, and the monochromatic light having the wavelength specified by the wavelength select signal W is emitted. The monochromatic light passes through the film 1 and is reflected at the interface 3, thereby performing light amount measurement through the photodetector 40. In this case, if the amount of the detected monochromatic light having the selected wavelength is zero, the thickness of the film 1 can be calculated by the control unit 30 using the value d0/$\lambda$0 stored in the RAM in accordance with equation (10). However, when the detected amount of light is not zero, a wavelength select signal W for emitting monochromatic light having another wavelength from the unit 20 can be generated from the control unit 30. By using the monochromatic light having this wavelength, the control unit 30 detects whether or not the detected amount of light becomes zero.

Figure 3:
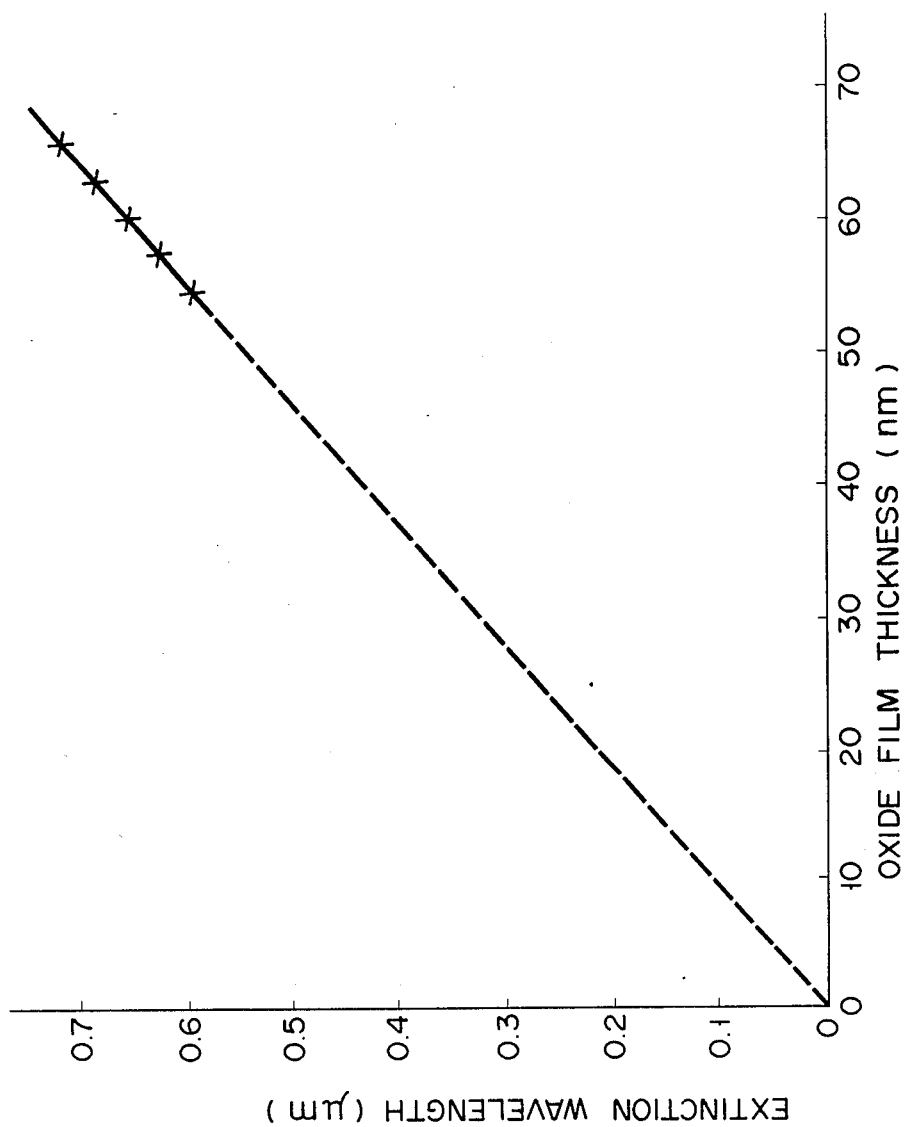
FIG. 3 is a graph showing the relationship between the film thickness measured by the apparatus shown in FIG. 1 and the extinction wavelength.

FIG. 3 is a graph showing the relationship between the measured chromium oxide film thicknesses and the extinction wavelengths. As is apparent from FIG. 3, it is understood that equation (10) is established.

In this manner, according to this embodiment, when the value $d0/\lambda 0$ is known in advance, the wavelength of the incident monochromatic light I is swept to cause the control unit 30 to detect the wavelength $\lambda$ at which the detected amount of reflected light R becomes zero, thereby calculating the film thickness with only a simple calculation. According to this method, mechanical adjustment like in the prior art need not be performed. Therefore, the apparatus using this method can be suitable for on-line film thickness measurement. In addition, wavelength sweeping may be performed by, for example, a microprocessor arranged in the control unit 30 at high speed, so that high precision film thickness measurement can be continuously performed. In addition to these advantages, the measurement precision will not be substantially influenced by coarseness and contamination on the surface of the film 1. When the Babinet-Soleil's compensator 26 shown in FIG. 2 is replaced with a Pockels effect element, a mechanical drive section such as the motor 27 may be eliminated.

Figure 4:
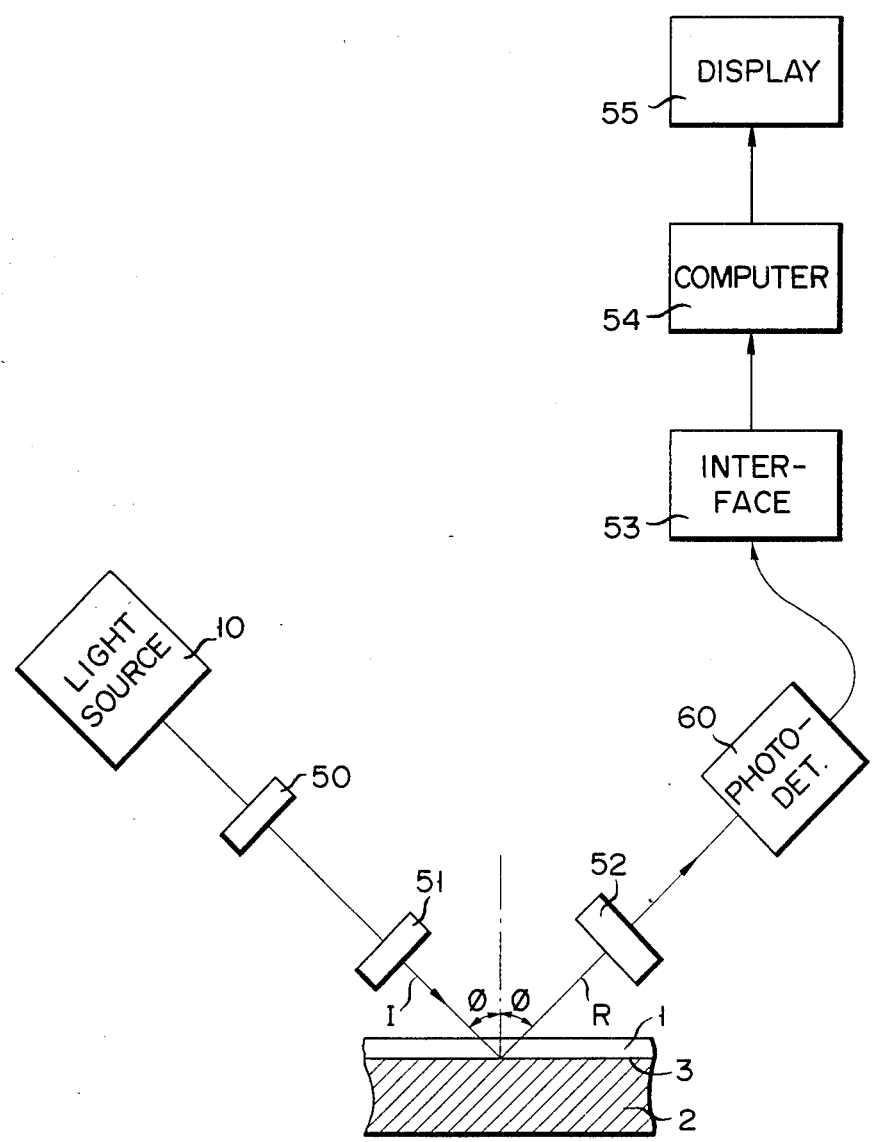
FIG. 4 is a block diagram of an apparatus for measuring a thickness of a film formed on an object to be measured according to another embodiment of the present invention.

A second embodiment of the present invention will be described. Referring to FIG. 4, light I having continuous spectral components from a light source 10 is incident on a film 1 through a polarizer 50 and a phase compensator 51. The phase compensator 51 comprises a ¼ wavelength plate for a wavelength $\lambda 0$. An orientation angle of the phase compensator 51 is fixed at $+(\pi/4)$ or $-(\pi/4)$. The wavelength $\lambda 0$ represents a center wavelength of the spectral wavelengths to be measured.

Figure 5:
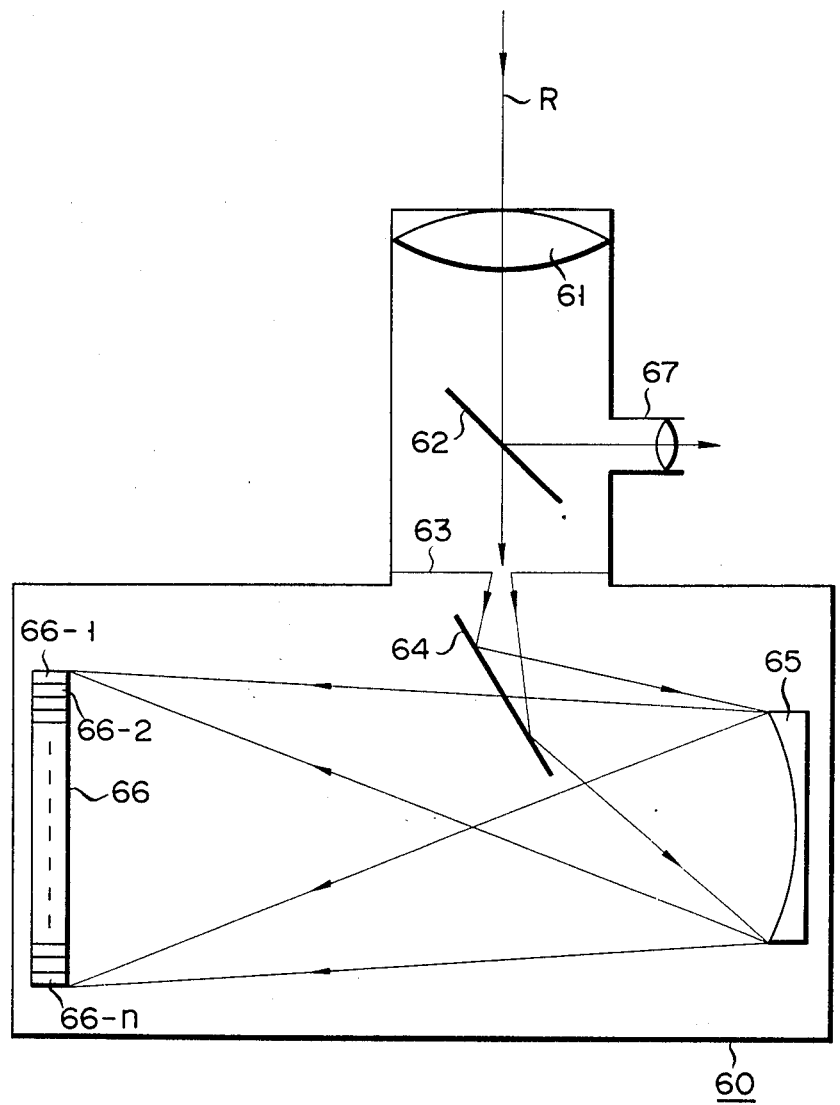
FIG. 5 is a representation of a photodetector shown in FIG. 4.

Reflected light R is guided to a photodetector 60 through an analyzer 5. The photodetector 60 also serves as a spectroscope for measuring the amount of spectral components. A detailed arrangement of the photodetector 60 is illustrated in FIG. 5. Monochromatic light R reflected through the film 1 to be measured is focused on a slit 63 through a lens 61 and a sliding mirror 62. Light incident on the slit 63 as a secondary light source is reflected by a mirror 64 and is guided to a diffraction grating 65. The reflection directions of light components reflected by the diffraction grating 65 vary in accordance with the wavelengths of the light components and serve to focus the spectral light components on a linear array 66. The linear array 66 comprises a multi-channnel detector having a plurality aligned photoelectric transducers 66-1, 66-2 . . . 66-n. The amounts of light which are detected by the respective photoelectric transducers 66-1 to 66-n of the linear array 66 corresspond to the specific wavelengths of the spectral distribution of the incident light, respectively. When the outputs from the linear array elements 66-1 to 66-n are sequentially aligned, the spectral distribution of the incident light can be obtained. In this manner, the photodetector 60 produces the spectral distribution of the reflected light R. Reference numeral 67 denotes a finder.

Since the light source 10 and the linear array 66 have spectral characteristics, an error occurs when the respective outputs from the linear array photoelectric transducers 66-1 to 66-n are used to directly measure the extinction wavelength. In order to solve this problem, the output from the photodetector 60 is supplied to a computer 54 through an interface 53. The computer 54 compensates for the spectral characteristics of the light source 10 and the photodetector 60, detects the extinction wavelength $\lambda$, and calculates the film thickness d in accordance with equation (10). Reference numeral 55 denotes a display.

The operation of the apparatus according to the second embodiment will be described hereinafter. The output light I from the light source 10 irradiates the film 1 at an incident angle $\phi$ through the polarizer 50 and the phase compensator 51. The light R reflected through the film 1 is detected by the photodetector 60 through the analyzer 52.

A central film thickness within the possible measurement thickness range is given to be d0. When the orientation angle $\phi$ of the polarizer 50 is properly selected under the conditions that the incident angle $\phi$ is held constant and the thickness of the film 1 is given to be d0, the reflected light R comprises linearly polarized light. The analyzer 52 is arranged at an orientation angle $\chi$ so as to extinguish the linearly polarized light R. The photodetector 60 spectrally measures the amount of reflected light, so that the amount of light at the frequency $\lambda 0$ becomes zero, thereby detecting the extinction wavelength $\lambda 0$.

The orientation angles $\phi$ and $\chi$ of the polarizer 50 and the analyzer 52 can be calculated in accordance with equations (1) to (7) as follows:

$$\theta = \Delta/2 \tag{11}$$

$$\chi = \Psi/2 \tag{12}$$

where d0 is the film thickness, $\phi 0$ is the incident angle, $\lambda 0$ is the wavelength, N1 is the refractive index of the film 1, N2 is the refractive index of the underlying material 2, and N0 is the refractive index ($=1$) of the medium (i.e., air). In this manner, the orientation angles become half of $\Delta$ and $\Psi$.

In this case, assume that an underlying material 2 comprises a silicon substrate, and that the film 1 comprises an $SiO_2$ film. FIG. 6 shows the amount of light detected by the photodetector 60 under the above assumption. Referring to FIG. 6, the wavelength is plotted along the abscissa, and the amount of light is plotted along the ordinate. In the graph shown in FIG. 6, the amount of light from the light source 10 is given to be constant at a wavelength range of 400 to 900 nm, and the wavelength sensitivity of the photodetector 60 is given to be constant.

The following information is given: $d1=100Å$, $\lambda 0=633$ nm, $\phi 0=70$ degrees, $N0=1.0$, $N1=1.46$, and $n2=4,044-0.028$ i. As is apparent from FIG. 6, the amount of light becomes zero at the wavelength of 633 nm.

Figure 7:
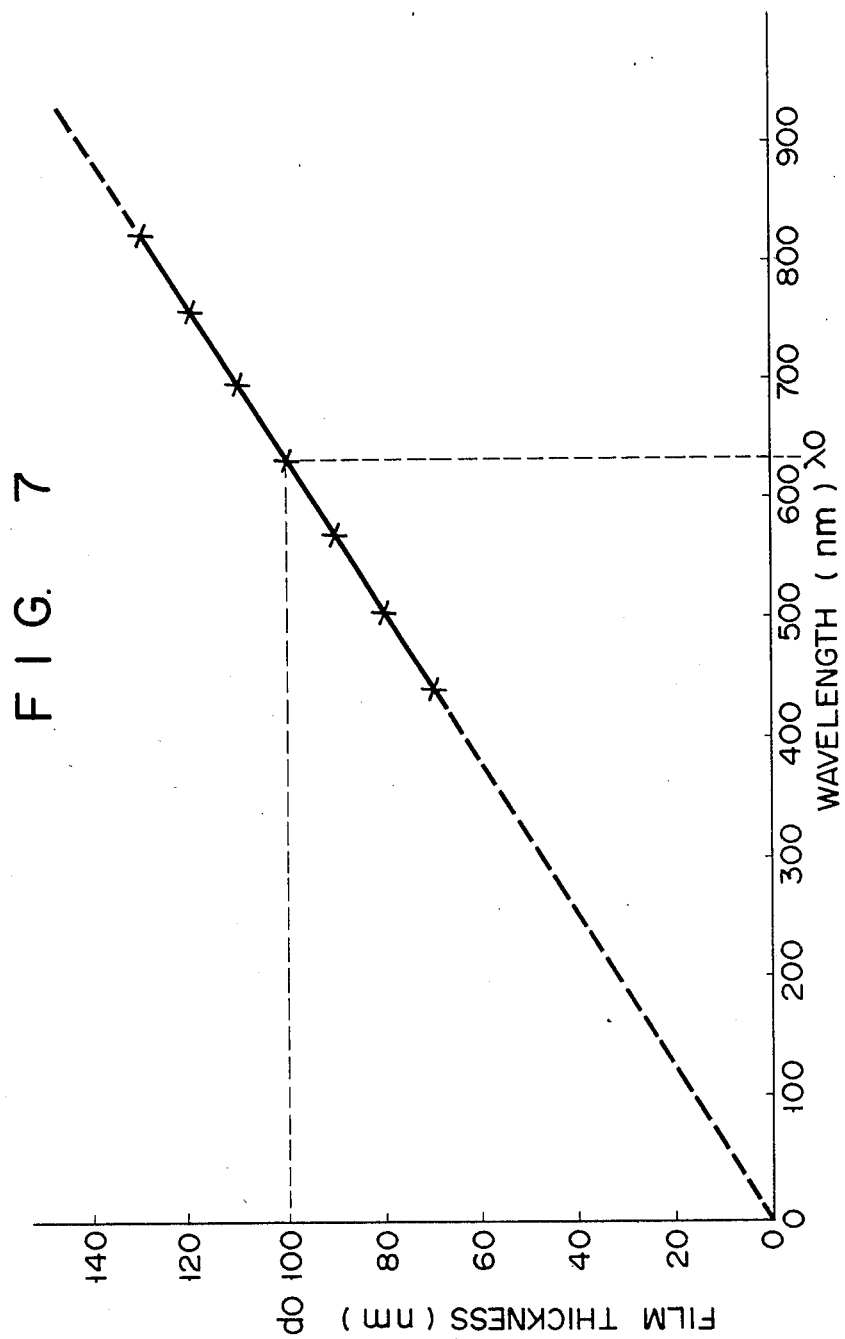
FIG. 7 is a graph showing the relationship between the film thickness and the extinction wavelength in the apparatus shown in FIG. 4.

When the film thickness varies within the range $\pm 30Å(\pm 30\%)$, the relationship between the film thickness d and the extinction wavelength $\lambda$ is as illustrated in FIG. 7.

The film thickness d0 at the wavelength $\lambda 0$ is $100Å$. As is apparent from FIG. 7, the film thickness d can be calculated by the computer 54 using the extinction wavelength $\lambda$ in accordance with equation (10). In this case, when condition $d0\pm 30\%$ is established, measurement error of the film thickness d falls within 1%.

In the apparatus shown in FIG. 4, if the following condition is given:

$$\lambda \neq \lambda 0$$

the phase angle will not become 90 degrees, and the complete extinction state will not be obtained. However, if a thickness to be measured falls within the range of d0±30%, a minimum light amount wavelength is present, as shown in FIG. 8. Even if this wavelength is regarded as the extinction wavelength λ, the measurement error falls within 1%.

Referring to FIG. 8, the film thickness d is 70 Åwhich is smaller by 30% than that shown in FIG. 6. The possible measurement range is limited due to the wavelength characteristics of the light source 10 and the analyzer 52 when the orientation angles of the polarizer 50 and the analyzer 52 are predetermined. Even if the film thickness measurement range is wide, measurement can be performed in the following manner.

The orientation angles of the polarizer 50 and the analyzer 52 can be selected such that the incident light I having the center wavelength λ0 can be extinguished at a predetermined incident angle $\phi$ when the film thickness changes in an order of d0, d1, d2 ... dn (d0<d1<... dn). The orientation angles of the polarizer 50 and the analyzer 52 which correspond to d0 to dn are given as $\theta 0, \theta 1, \theta 2 ... \theta n$, and x0, x1, x2 ... xn, respectively.

The center film thickness di (i=0, 1, 2 ... n−1) is determined to satisfy the following inequalities:

$$1.3 di > 0.7 di \qquad (13)$$

$$di + 0.3 di > d_{i+1} - 0.3 d_{i+1} \qquad (14)$$

In addition, if a device for aligning the orientation angles of the polarizer 50 and the analyzer 52 with $\theta i$ and $\chi i$ is arranged in the apparatus, the possible measurement range can be widened.

According to the apparatus of the second embodiment, the orientation angle $\theta$ of the polarizer 50 is selected to linearly polarize the light having continuous spectral components from the light source 10 so as to obtain light having the wavelength λ0 and reflected through the film 1 having the thickness d0. In addition, the analyzer 52 is arranged at the orientation angle so as to extinguish the linearly polarized reflected ligh R, thereby detecting the extinction wavelength λ caused by a change in film thickness d by means of the photodetector 60. The computer 54 then calculates the thickness d by using the extinction wavelength λ in accordance with equation (10). Therefore, the film thickness d can be immediately calculated in the same manner as in the first embodiment. The extinction wavelength λ is measured in accordance with an amount of spectral component at the same measuring point in a real-time manner, so that the coarse surface and contamination which locally change the absolute amount of light will not influence the measurement, thereby performing accurate measurement of the film thickness d.

Furthermore, no mechanically movable components are use, so the apparatus can provide continuous on-line film thickness measurement.

According to the first and second embodiments, the reflected light is extinguished at the wavelength λ0 when the film thickness is set to be d0. The extinction wavelength λ changing in accordance with a change in film thickness d is detected. By using the detected extinction wavelength, the film thickness d is calculated in accordance with equation (10), thereby immediately calculating the film thickness d.

In addition to this advantage, when the range of changes in film thickness is known in advance, and when the measurement range is relatively narrow, the orientation angles of the polarizer and the analyzer need not be shifted to perform accurate measurement.

In the apparatus according to the present invention, light having the reference wavelength λ0 irradiates the object, and the reflected light is detected by the photodetector to obtain the extinction wavelength λ0. Then the extinction wavelength caused by the film thickness difference can be detected in accordance with the light amount signal from the photodetector. The film thickness is calculated in accordance with the extinction wavelength. Unlike the conventional apparatus wherein the film thickness is measured in accordance with polarization analysis, the cumbersome operation need not be performed, thereby providing an apparatus suitable for on-line use.

What is claimed is:

1. An apparatus for measuring a film thickness, comprising:
    a light source for emitting light having continuous spectral components;
    polarization controlling means for polarizing the light along a predetermined direction and radiating polarized light onto the object;
    a photodetector for detecting an amount of light reflected by the object and generating a light amount signal;
    means for detecting data representing a wavelength of a spectral component in accordance with the light amount signal such that the amount of light reflected by the object and incident on the photodetector becomes zero; and
    film thickness calculating means for calculating the thickness of the film formed on the object in accordance with the detected data.

2. An apparatus according to claim 1, wherein said polarization controlling means includes means for selecting monochromatic light having a predetermined wavelength from said light source and giving a predetermined phase difference.

3. An apparatus according to claim 2, wherein said polarization controlling means comprises: wavelength select signal output means; means for generating an ultrasonic beam having a frequency corresponding to a wavelength select signal generated from said wavelength select signal output means; an acoustooptic filter driven by the ultrasonic beam generated from said ultrasonic generating means, the light from said light source being incident on said acoustooptic filter; means for producing linearly polarized light from light passing through said acoustooptic filter; and a phase compensator for giving a predetermined phase difference to output an ellipticaly polarized light from said linearly polarizing means.

4. An apparatus according to claim 1, wherein said photodetector includes means for producing a light amount signal to each of spectral components of the reflected light for detecting a wavelength at which an amount of light becomes zero.

* * * * *